July 26, 1955 N. WHITEHEAD 2,714,201

IDENTIFICATION SELECTOR

Filed Nov. 18, 1953 6 Sheets-Sheet 1

INVENTOR.
NED WHITEHEAD
BY Lyon & Lyon
ATTORNEYS

July 26, 1955 N. WHITEHEAD 2,714,201

IDENTIFICATION SELECTOR

Filed Nov. 18, 1953 6 Sheets-Sheet 2

INVENTOR.
NED WHITEHEAD
BY Lyon & Lyon
ATTORNEYS

July 26, 1955 N. WHITEHEAD 2,714,201

IDENTIFICATION SELECTOR

Filed Nov. 18, 1953 6 Sheets-Sheet 3

INVENTOR.
NED WHITEHEAD
BY Lyon & Lyon
ATTORNEYS

July 26, 1955 N. WHITEHEAD 2,714,201

IDENTIFICATION SELECTOR

Filed Nov. 18, 1953 6 Sheets-Sheet 4

INVENTOR.
NED WHITEHEAD
BY Lyon & Lyon
ATTORNEYS

INVENTOR.
NED WHITEHEAD
BY Lyon & Lyon
ATTORNEYS

July 26, 1955 N. WHITEHEAD 2,714,201

IDENTIFICATION SELECTOR

Filed Nov. 18, 1953 6 Sheets-Sheet 6

INVENTOR.
NED WHITEHEAD
BY Lyon & Lyon
ATTORNEYS

United States Patent Office 2,714,201
Patented July 26, 1955

2,714,201

IDENTIFICATION SELECTOR

Ned Whitehead, San Juan, Puerto Rico

Application November 18, 1953, Serial No. 392,930
8 Claims. (Cl. 340—149)

This invention relates to an automatic system for inspecting and identifying a card as being authentic. More particularly, this invention relates to a system whereby, in order to enter a restricted area, a person must insert an identification card into the apparatus which is the embodiment of the present invention, and if the card is properly marked, the person will be permitted to pass into the restricted area. If the card is not properly marked the card will be retained and passage into the area will be denied.

The systems used today for determining whether or not an authorized person is permitted to enter into an area or plant are to present a card having a photograph of the person and other identifying information in writing to a guard at each of a number of guarded entrances. A system of this sort, to those who are familiar with them, often permits unauthorized persons to enter the plant, since in many instances the card inspection by the guards is perfunctory, especially during the times when large numbers of employees are entering or leaving the plant.

Accordingly, an object of this invention is to provide a card inspection system which accurately inspects each card presented to determine its authenticity.

Another object of the present invention is to provide a system in which rapid yet careful card inspection is available.

A further object of the present invention is to permit a system wherein one guard may serve a number of entrance gates. This is made possible since by using the embodiment of the invention described herein, the mechanical card duty of inspection is removed from a guard who can then remain in a central location until notified by operation of the inspection apparatus that an unlicensed person is attempting to enter the restricted area, or an error has been made or the card belongs to a person who is wanted for an interview.

A further object of this invention is to provide a system whereby cards may be coded, and such code may be readily changed without the knowledge of the bearer thereof.

These and further objects of my invention are achieved by providing apparatus wherein a housing encloses a slot in which cards are inserted. These cards have a plurality of columns; each column includes a plurality of digit positions. An identifying mark or perforation is made in each column on a digit position. The housing contains a plurality of perforation sensing means and there is a mechanism in said slot which holds the card in the slot until a release is authorized. There is also means in the slot responsive to the insertion of the card to energize the card-retaining means and to energize the perforation sensing means to sense the digit positions on the card.

The housing carries a plurality of columns of keys, each column being identified with a column of digit positions on the card and each key being identified with a digit in said column. The holder of the card pushes a key in each column corresponding to the digit marked in each column of his card.

Each of a plurality of first switches or relays is associated with a digit position in each column on a card. Upon the actuation of a key and the sensing of a digit position, both key and position sensed being in correspondence, a corresponding first switch is closed.

There are also provided means to interconnect different ones of said first switches in one column with different numbers of said first switches in the other column. A reject switch is provided and when the ones of said first switches which have been interconnected are closed, the rejection switch is operated. It provides a warning and the card cannot be removed from the slot until a guard approaches and turns off the power. If switches other than the ones interconnected are closed, then the mechanism which retains the card in the slot is released and a mechanism is actuated which ejects the card. Furthermore, a gate which has been closed heretofore is opened for a period sufficient to permit the passage of the authenticated card holder to pass through. Mechanism is also provided wherein, if desired, the reverse operation is permitted, i. e., only the cards bearing perforations corresponding to the interconnected first switches may be accepted and other cards rejected and held.

Means also are provided whereby the switch closed in each column provides a voltage to a sensing means and if the switches are closed in a combination other than one which is authorized, the sensing means detects this and warns the guard and retains the card.

Other objects and advantages of the present invention will be apparent from the following detailed description of a preferred embodiment thereof.

Figure 1:
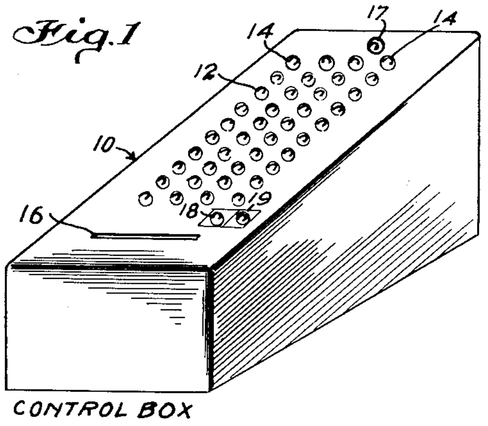
Figure 1 is a perspective drawing of a housing in which a card is inserted and which carries columns of keys.

Reference is now directed to Figure 1 where there may be seen the top of a housing 10 which carries a keyboard having four columns of keys. There are ten keys 12 in each column. Each of the keys in the first column is identified by a letter A, B, D, E, G, H, K, L, M, S; the second column represents hundreds digits 1–0; the third column tens digits 1–0; and the fourth column units digits 1–0. At the top of each column is a light 14. A slot 16 is provided into which the card to be authenticated is inserted.

A light 17 at the very top of the housing is provided which is illuminated when the apparatus is operated and two lights 18, 19 to the right of the slot are provided, one of which illuminates to indicate that the card has passed, the second of which, 19, illuminates to indicate that the card is rejected.

Figure 1A:
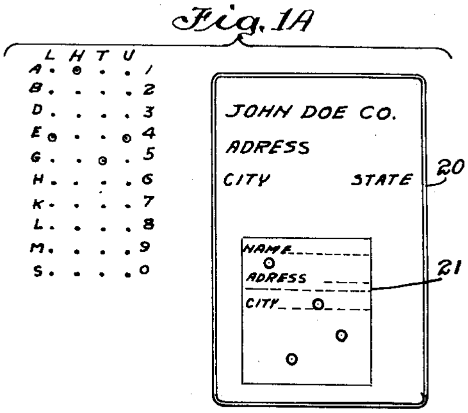
Figure 1A shows one type of identification card which may be authenticated by means of the present invention.

An example of the cards which this apparatus may be used to inspect are shown in Figure 1A. The cards used are of a type issued in many plants and consist of a laminated plastic. The card 20 has an area 21 corresponding to a coding field. This field is shown enlarged to the left of the card in Figure 1A. There are four columns in this field. The first column L has 10 digit locations identified by letters A–S, the second and third columns H, T, U, are the hundreds, tens and units columns which have digit locations identified by the digits 1–0. The card has four holes punched therein, one in each column corresponding to a four-digit number; for example, in the coding field number E154 is represented. This number is not readable from the card without a knowledge of the coding scheme used to punch the holes in the card. Since there are millions of such codes possible, it is very difficult to discover the coding scheme unless a very large number of the total group of cards could be studied.

The number that is assigned to the user is confidential and is known only to the card user and the security officer of the area.

The apparatus which is an embodiment of the present invention is usually positioned near an entrance gate, which is normally closed. To secure admission the bearer of the card will insert his card 20 into the card slot 16 provided in the apparatus. He then registers his number by pressing the appropriate keys 12; for example, if his number is E154, he will press the keys which correspond to this number. As each key is pressed, the light 14 above the column is extinguished indicating that the number represented by the key has been registered. If the number agrees with that on the card, and other conditions which are predetermined are satisfactory, the card is ejected or released from the card slot and a green pass light 18 on the keyboard is illuminated. The gate is also released electrically by this invention for a single admission. After a predetermined period which can be set within this invention, the gate closes and the apparatus is restored for use again. The period usually assigned is two seconds.

If a number is not properly keyed and if by reason of predetermined settings within the apparatus, the card is rejected, the card will be held locked in the card slot until released by an attendant or guard who will be summoned by an alarm located in the guardhouse and actuated by the selector unit.

Figures 2, 2A:
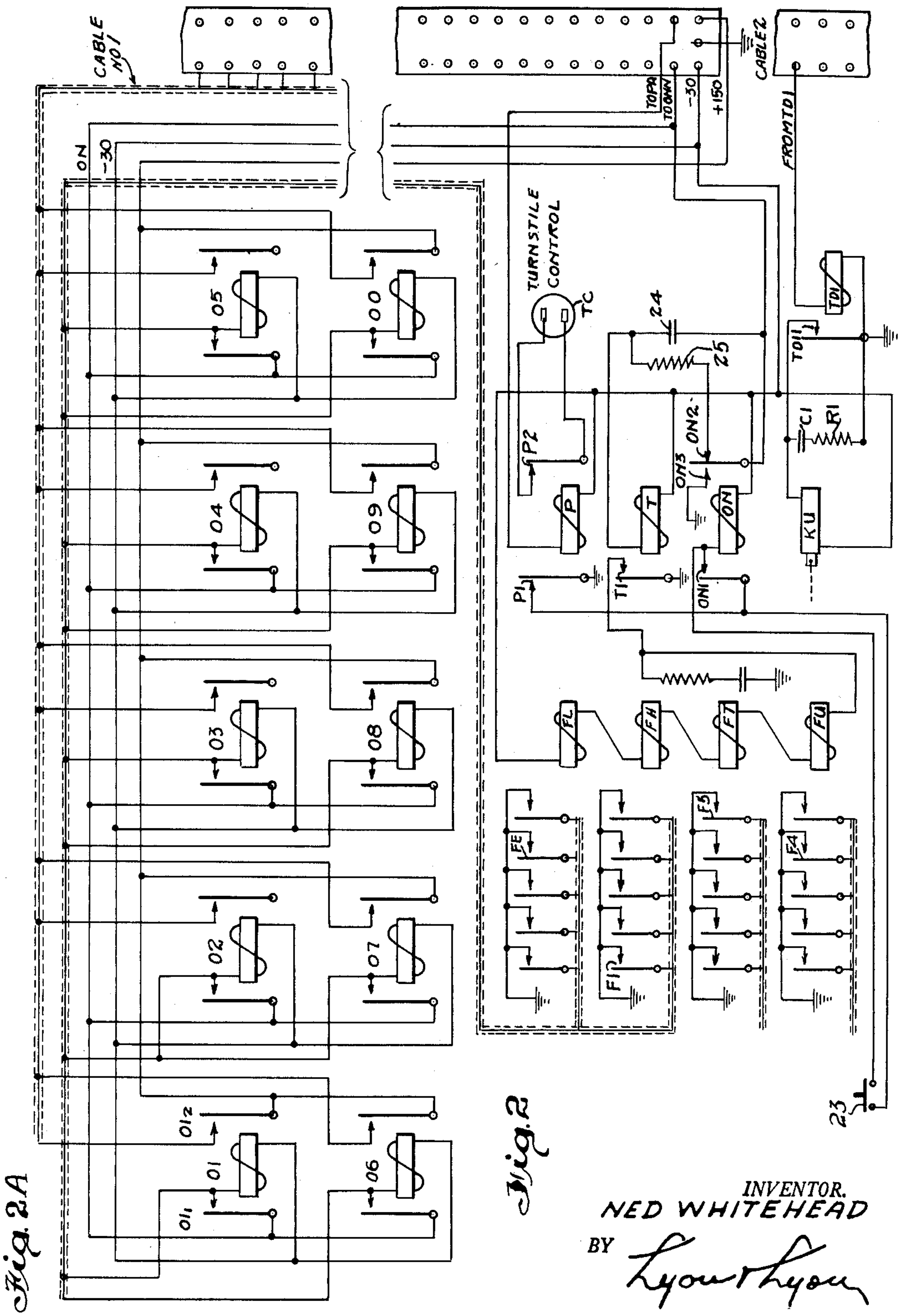
Figure 2 is a schematic diagram of the card feeler relays and circuits which operate to initiate the operation of ensuing apparatus in the system.
Figure 2A is a schematic diagram of the sensing relays used in the embodiment of the invention.

Reference is now made to Figure 2 of the drawings where there is shown the apparatus which initiates operation of the system. At the bottom of the slot in the housing there is a microswitch 23. This microswith is closed by the insertion of the card. Closing the microswitch operates a relay designated as "ON." The ON relay has three contacts designated as ON1, ON2 and ON3. Closure of the ON1 contact locks in the ON relay to ground through contact P1 of a P relay. The ON relay also serves as a stick relay to hold the card in the slot and will not release it until it is released.

Closing the ON3 contact also permits a condenser 24 to be charged from a −30 volt source which can be traced through the coil of a relay T through the condenser 24, through ON3 contact to ground. When the ON relay is inoperative, condenser C is discharged through the OW3 contact and through a resistor 25. While condenser C is charging relay T is operated. Contact T1 is closed and applies ground to feeler relays FL, FH, FT, and FU. These relays are of a type which have an armature extension that engages a stainless steel rod extending into the card slot. In the normal condition the ends of these rods (not shown) are flush with the sides of the card slot, and unless there is a hole in the portion of the card field adjacent the end of the rod, the rod is prevented from moving more than a few mills by the card and as a result, the relay cannot close its contact. When a card is in position, one contact in each one of the feeler relays will close, however, since there are four holes punched in the card. These contacts can be designated as contacts $F_E$, $F_1$, $F_5$, $F_4$, in order to preserve the association with the perforations in the card which has been assumed as identified by that number.

It will be appreciated that each feeler relay requires as many sensing contacts as there are digit positions to be sensed in each column. In the embodiment of the invention there are ten digit positions to be sensed in each column and, although five contacts are shown for each relay, ten of them are actually required. Each one of the contacts of the feeler relays are connected to a corresponding sensing relay in a second group of relays. These sensing relays are shown in Figure 2A. One sensing relay is associated with each feeler relay contact. Since, accordingly, forty sensing relays are required, in order to reduce the complexity of the drawings, only ten of these relays, designated from O1 to O0, are shown. It is to be understood, however, that ten sensing relays are associated with one feeler relay and each of these ten is associated with a different feeler contact of the feeler relay. When a feeler contact is closed, it serves to provide ground through a conductor to the coil of its associated sensing relay (which in this instance may be designated as the O1 relay). The O1 relay operates and thereby locks itself in operating condition to ground through its $O1_1$ contact and armature over a cable connection which goes back to the ground connection supplied by contact ON3.

Figure 6:
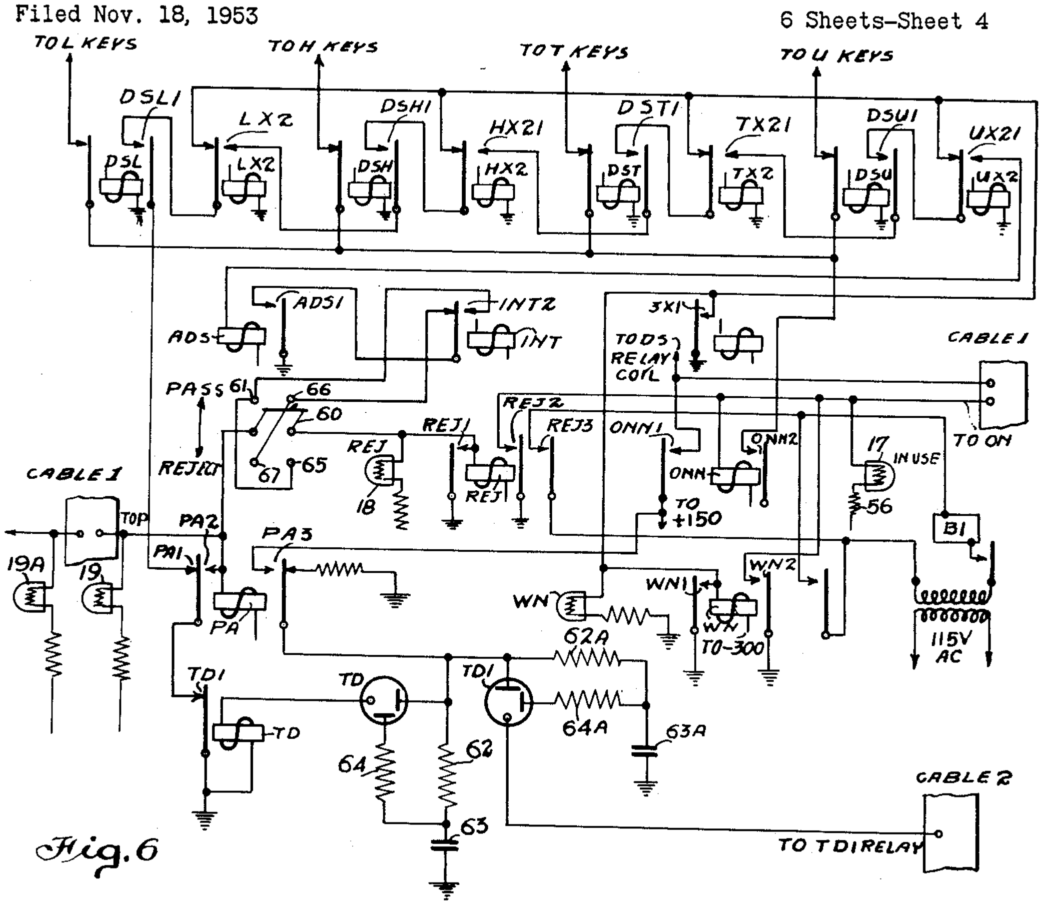
Figure 6 shows the schematic circuit diagram for the relays used in authenticating a card as a result of the operation of the circuit shown in the previous drawings.

The ground supplied by the ON3 contact is also connected via a cable 1 to an ONN relay, shown in Figure 6, to operate it and also to light the "in use" light 17. The $ONN_1$ contact closes to provide 150 volts to operate DS relays which will be subsequently described. The $ONN_2$ contact closes to provide 150 volts to the contacts of these DS relays to be employed in a manner also to be subsequently explained in connection with Figure 7.

Referring again to Figure 2, the T relay is held closed for a period determined by the time required to charge the condenser C through the relay coil. All the operations described herein for inspecting a card must occur during that time. If the operation is not completed the system stops when T1 opens, the condenser C discharges through resistance R1 and then, since microswitch M must still be closed by reason of the card still being in the slot, the ON relay operates to start the cycle again.

Referring again to Figure 2A, the O1 relay which was operated closes the $O1_1$ contact to hold it operated. It also closes the $O1_2$ contact. This contact is connected via a cable 1 to the circuit shown in Figure 3.

Figure 3:
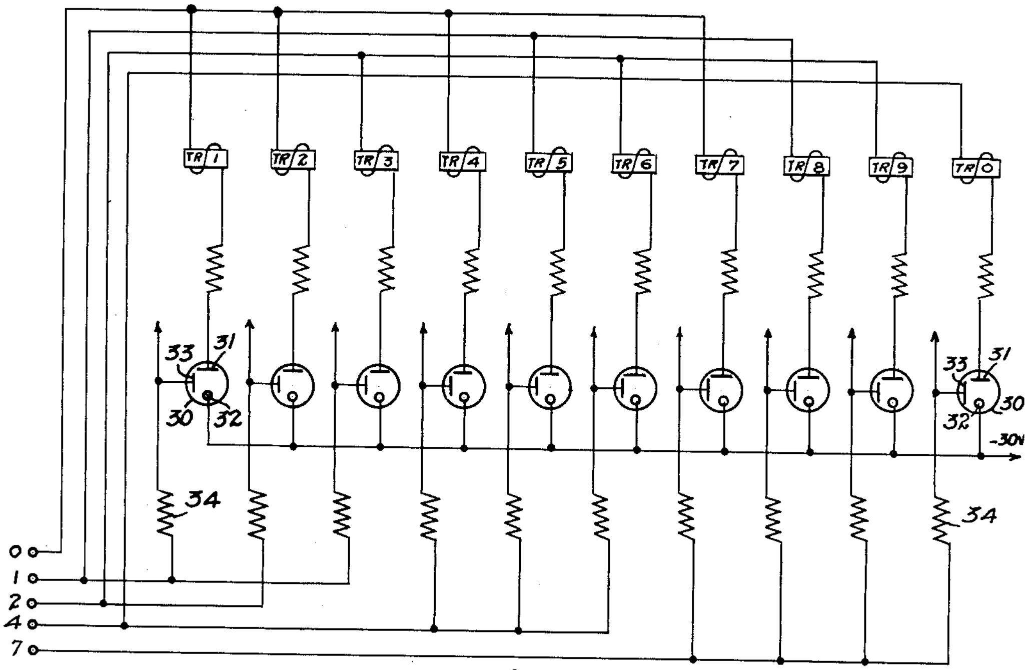
Figure 3 is a schematic diagram of the translator relays and switch tubes employed in the subject embodiment of the invention.

Figure 3 exemplifies the translator circuit of the embodiment of the invention. There are provided ten switch tubes 30 of the type having an anode 31, a cold cathode 32 and a starter or igniter electrode 33. In series with each anode is a translator TR1–TR0 relay. The cathodes are returned to a common bus to a source of voltage designated at −30 volts here. The igniter electrode 33 in each instance is connected through a limiting resistor 34 to terminals which are designated at 1, 2, 4, 7 for reasons which will be gone into hereafter. The side of the TR relay winding which is not coupled to the anodes 31 of the respective switch tubes 30 are also connected to terminals 0, 1, 2, 4, 7.

As previously stated, there are ten switch tubes with their associated TR relays shown. These are representative of the equipment necessary for one column of keys. Accordingly, four of the circuits shown in Figure 3 are necessary for this invention. Therefore forty tubes 30 and relays TR are necessary in all. Each of these is associated with a digit position on a card. Ten of these are associated with each column of keys and digit positions. Each of these ten groups may be designated similarly with L, H, T and U. The terminals 0, 1, 2, 4, 7 are connected to certain groups of the TR relays. Terminal 0 goes to TR relays TR1, TR2, TR4, TR7. The terminals 0, 1, 2, 4, 7 will be connected to the $O1_2$ contacts of associated groups of sensing relays shown in Figure 2A via cable 1. Thus the 0 terminal will be connected to the $O1_2$ contacts of relays O1, O2, O4, and O7. The $O1_2$ contact provides 150 volts operating potential to the anodes of the group of switch tubes connected thereto when the corresponding sensing relay is closed.

In operation, when one of the sensing relays shown in Figure 2 is closed, it applies operating voltage to given ones associated therewith of the switch tubes in Figure 3. The switch tubes which have potential applied to their anodes (with the example as shown, this will be the switch tube in series with relays TR1, TR2, TR4, and TR7). However, none of these tubes can be fired until the starting electrodes have igniting potentials applied thereto. It will be recalled that four Figure 2A's and four Figures 3's are required, and, therefore, only four sensing relays altogether are operated. Therefore operating potential appears on only four of the interconnections between the four Figure 2A's and four Figure 3's, one for each set.

Figure 7:
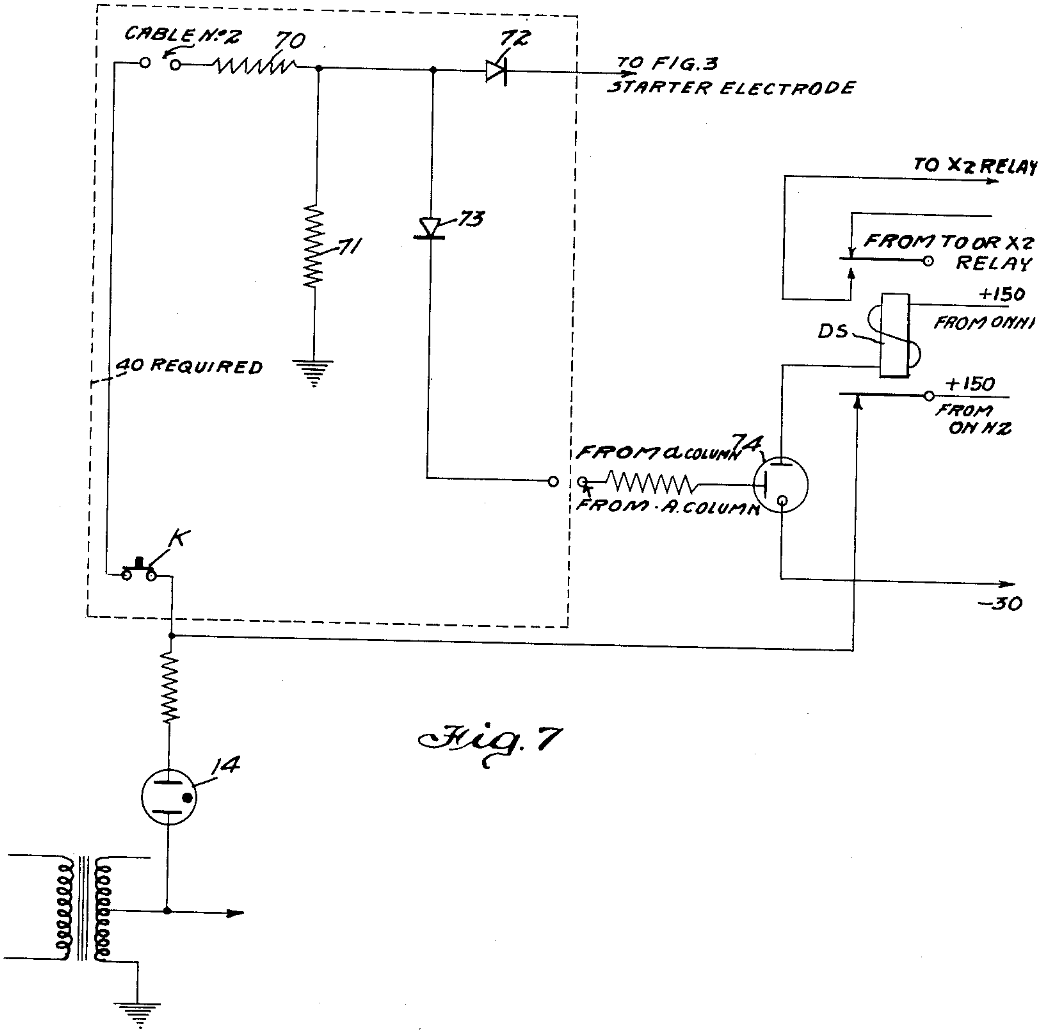
Figure 7 is a schematic drawing exemplifying the details of the connections for four of the relays shown in Figure 6, together with a key circuit.

Reference is now made to Figure 7, which exemplifies the apparatus for applying these igniting potentials. A key K is shown representative of one of the keys 12 of the forty shown in Figure 1. When this key is closed it serves to apply 150 volts through a cable 2 to a voltage divider 70, 71 to which rectifiers 72, 73 are connected. Since there are forty keys, forty resistors 70, 71 and forty rectifiers 72, 73 are required. The anode of rectifier 72 is connected to the starting electrode 33 of a switch tube in Figure 3. Connections between the forty rectifiers 72 and the forty starter electrodes are made of course to preserve the digit position association of the keys, the TR relays and the switch tubes.

In the example assumed, the user of the apparatus, after having inserted his card, will push the keys corresponding to E, 1, 5, 4 and, therefore, the leads from the cathodes of the rectifiers 72 will apply igniting voltages to the starting electrodes of the four switch tubes corresponding to E154. These tubes are then fired, closing the associated TR relays. However, it will be appreciated that if an error occurs, that is, the wrong key is punched, then all the switch tubes E154 will not be fired and neither will the switch tube which has its key punched since that tube may not have operating potential applied thereto via a correspondingly operated sensing relay.

Referring again to Figure 7, the glow tube 14 represents a light at the head of a column of keys shown in Figure 1. This light is turned on when a card is inserted in the slot, since, as was described previously in connection with Figures 2 and 6, the ON relay operates to operate the ONN relay which in turn provides 150 volts to the contacts of the DS relays.

Upon depressing the key K, 150 volts bias is also applied through rectifier 73 to the starter electrode of a switch tube 74. This switch tube has its anode in series with another relay designated as DS. A source of operating voltage is connected to the other side of the relay coil, as previously described, from the operated ONN relay. Accordingly, when the key K is depressed, the igniting potential is applied to the starting electrode of tube 74, causing it to fire and close relay DS. This opens up the current to light 14, whereby it is extinguished.

Relay DS and its attendant circuitry is representative of relays DSL, DSH, DST and DSU shown in Figure 6. Each relay is associated with the corresponding column of keys and the operation of any key in a column serves to operate its associated DS relay and extinguish the light 14 at the head of the column.

Key K is representative, as previously stated, of the keys shown in Figure 1. Accordingly, the key K can be representative of any one of the letter keys, units, tens and hundreds.

Figure 7 is shown in order to make an understanding of this invention and an explanation of its operation simpler.

Figure 4:
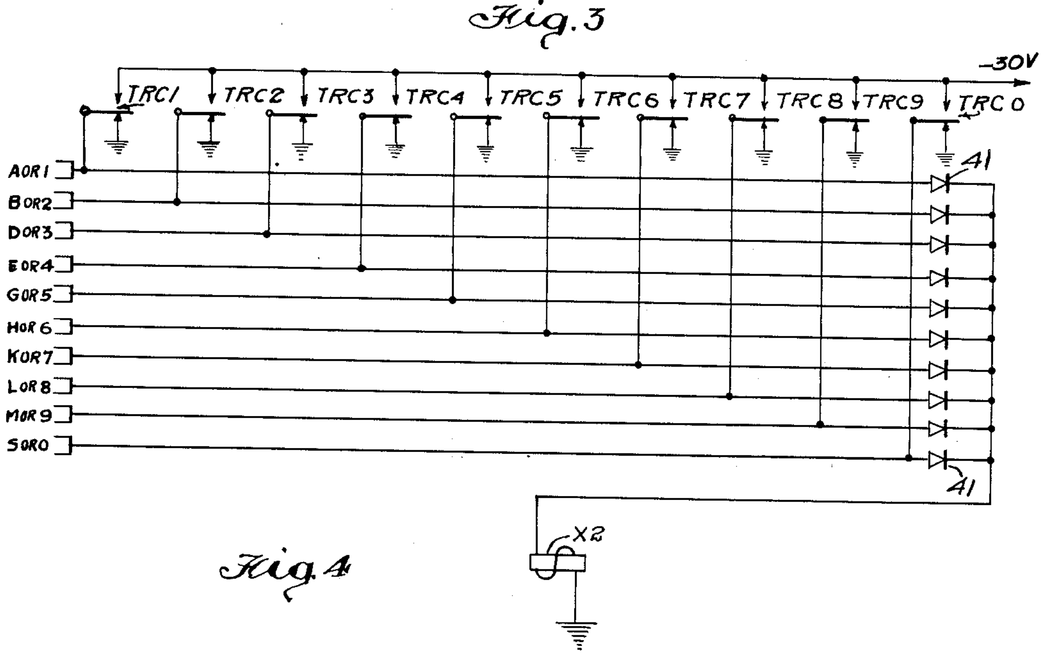
Figure 4 is a schematic diagram exemplifying the contact circuits for certain ones of the translator relays exemplified in Figure 3.

Reference is now made to Figure 4, whicth is representative of the contact connections for either the letters, or tens, or hundreds TR relays. Only the coils of ten of the relays are shown in Figure 3. It should be appreciated however that three times the number of contacts shown in Figure 4 are required. When any one of the TR relays of the lettered, or tens, or hundreds groups is closed, its armature swings to apply to one of its contacts TRC1–TRC0 a potential of −30 volts, which is applied through a rectifier 41 to a relay designated in this diagram as X2. This X2 relay is representative of one of the three relays LX2, HX2, TX2 shown in Figure 6. It is operated when any one of the TR relays is operated.

The other end of the leads which are connected from the armatures of the TR relays to the rectifiers 41 are brought out to respective terminals which are designated as selector terminals and are correspondingly identified with the letters, hundreds or tens.

Figure 5:
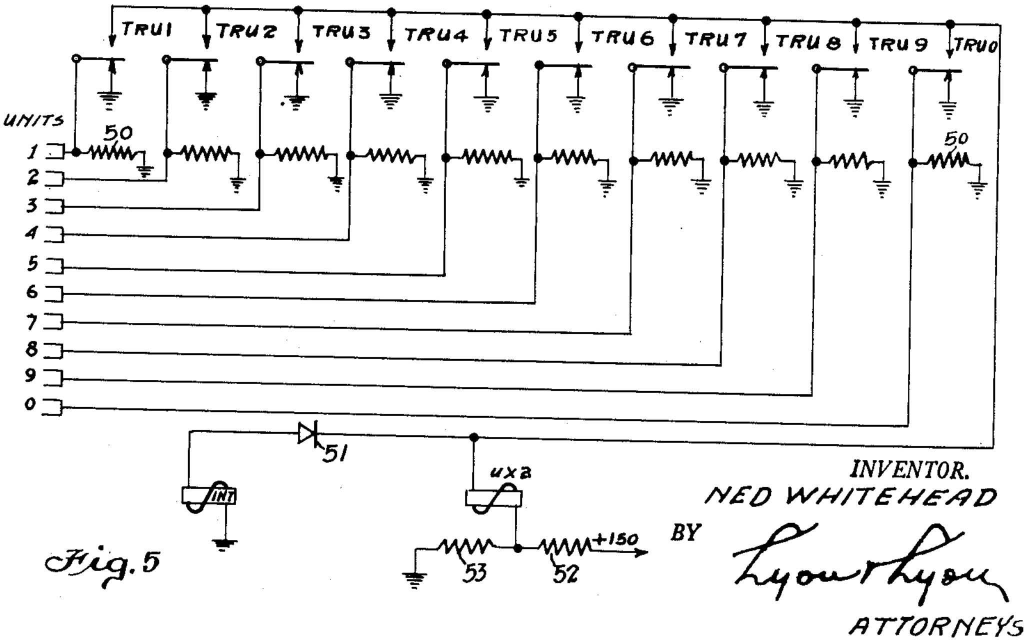
Figure 5 is a schematic diagram exemplifying the contact circuits for the remaining translator relays exemplified in Figure 3.

Reference is now made to Figure 5, which shows the contacts TRU1–TRU0 carried by the units TR relays in the translator circuit which is represented by Figure 3. Each contact has its armature connected through a resistance 50 to ground and also to a selector terminal field which is identified in each case with the same unit number as the relay. When a units relay (relay TR4), as represented in Figure 3, is closed, then the contact of that relay TRU4 is also closed. This provides a ground connection from a resistor 50 through a rectifier 51 to a relay designated as INT. Ground is also provided for a relay designated as UX–2. This UX–2 relay is the same as the one shown in Figure 6 of the drawings. The INT relay does not operate since no operating potential is provided. The UX–2 relay does operate, however, from the 150 volt source applied through resistor 52. Resistor 53 is provided to serve as a voltage divider together with resistor 52.

To review the operation of the system thus far, a card is inserted into the card slot, the feeler relays as represented in Figure 2 sense the perforations, and sensing relays are closed corresponding to the perforations sensed. These serve to apply operating potentials to switch tubes connected in series with transmitting relays shown in Figure 3. Pushing of the keys whose numbers or letters are identical with the code of the card perforations serves to apply igniting potentials to the switch tubes shown in Figure 3, whereupon, if there is correspondence between the keys pressed and the digits represented by the holes in the card, the proper switch tubes are fired, closing their associated transmitting relays. The contacts for these relays as represented by Figures 4 and 5 are closed accordingly. This serves to close relays UX2, TX2, HX2 and LX2 shown in Figure 6. Operation of the keys also serves to close relays DSU, DST, DSH and DSL and to extinguish the light at the head of each column of keys. These latter relays and lights were exemplified in Figure 7.

Figure 8:
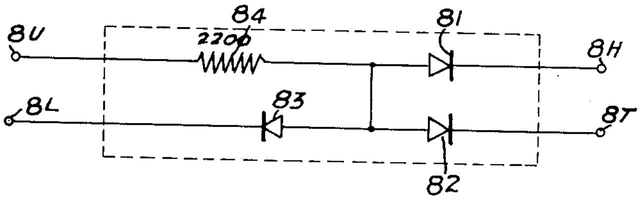
Figure 8 is a circuit diagram of the network which is used to interconnect the translating relays in order to determine which cards are to be passed or rejected, as desired.

Selection of cards which are to be approved or which are to be held is provided or enabled by means of equipment shown in Figure 8. Figure 8 shows a network which may be termed as a 1–A network. It consists of three rectifiers 81, 82 and 83, which have their cathodes connected together to one end of a resistance 84. The anodes of the respective rectifiers are brought out to connecting terminals designated as 8H, 8T and 8L. The other end of the resistor 84 is brought to a terminal which will be designated as 8U. A network is provided for each card that it is desired to reject or to select. Assume, for example, it is desired to pass a card which bears code E154. The 8U terminal of the network is connected to the units selector terminal shown in Figure 5, designated as 4. The 8L terminal will be connected to the letter E in the letter selector terminals as represented in Figure 4; terminal 8H will be connected to the one terminal in the hundreds selector terminal field, also as represented in Figure 4, and the 8T terminal is connected to the 5 selector terminal in the tens field, as represented in Figure 4. Accordingly, when the translator relays, exemplified in Figure 3, are operated by inserting card E154 in the slot and pressing the corresponding keys, the closing of the TR relay contacts serves to close the LX2, HX2 and TX2 relays. The closing of the TR relay contacts for the letters, hundreds and tens also serves to apply —30 volts to the respective E15 selector terminals and from thence via the 1–A network rectifiers to the units selector terminal 4. This in turn applies an operating potential through the rectifier 51 to the INT relay which is then operated.

Referring now to Figure 6, the operation of the DS and X2 relays is as follows:

The DS relays are slow acting; the X2 relays are quick acting. Accordingly, the X2 relays close prior to the DS relays. Ground may be traced through a contact TD1 of a TD relay through a contact PA–1 of a P–A relay to the armature of contact DSL1 of the DSL relay. The closing of the DSL relay applies ground to the armature of the LX2 relay which has been closed to its contact LX21. Ground is extended through the closed contact DSH1 of the next DSH relay to the armature of the HX2 relay. The HX2 relay contact HX21 picks up ground and applies it through the armature of the DST relay and its contact DST1 to the armature of the TX2 relay. The contact TX21 of that relay carries the ground to the armature of the DSU relay which, when operated, carries the ground to the armature of the UX2 relay. When the UX2 relay is operated, its contact UX21 carries the ground to the coil of the ADS relay, permitting it to operate.

If at any time one of the previously recited relays does not operate due to a failure of one of the switch tubes shown in Figure 3 to be fired, then ground is carried to a WN relay coil and a WN warning light. This WN relay operates and locks itself up over its contact WN1. It operates a buzzer B1 by closing a contact WN2 and it also holds the ONN relay operated as well as the ON or stick relay operated, which is shown in Figure 2. This warns a guard that an error in punching one of the keys has been made or a defect in the system has occurred. In any event, the card is held and the individual presenting that card is not permitted to pass until the guard rectifies the condition which created the operation of the warning relay WN.

Assuming that the relays in the DS and X2 chain have been properly operated and the relay ADS operates accordingly, a double pole double throw switch 60 having one position designated as "pass" and the other position designated as "reject," determines whether the card is one of those to be passed or to be rejected.

Consider the switch operated to the pass position. If the INT relay does not operate because a card does not have the coded perforations selected by the 1–A network, ground is passed from the ADS1 contact through the INT2 contact, through terminal 66 of the pass-reject switch to operate the reject light 18 and reject relay REJ. The relay REJ locks up to ground over contact REL1 and provides a locking ground through its contact REJ2 to the ONN and ON relays, thus holding the card. Contacts REJ3 operate the warning buzzer B1.

Assume now that an inserted card does have perforations in accordance with the code selected by a 1–A network. Ground, which is provided by operation of the ADS1 contact, is applied via the INT1 relay contact (which was operated by means of the 1–A selecting network previously described in connection with Figures 5 and 8), is carried through the upper terminal 61 of the switch to the PA relay coil. The PA relay is operated, closing contacts PA2 and PA3. This opens the ground which was applied to the DS–X2 relay chain through contact PA1 and applies it through contact PA2 to the light 19 on the housing 10 shown in Figure 1, designated as the "pass" light, and, also to another light 19A which may be positioned in the guard house. 150 volts is applied through contact PA3 to a network consisting of a switch tube designated as TD, which has the TD relay coil connected in series with its cathode and a time delay network consisting of a resistor 62 in series with a condenser 63 and a second resistor 64 connected between the junction of resistors 62 and condenser 63 to the starting anode of the switch tube TD.

A second switch tube TD1 has its anode connected to receive 150 volts from contact P3 and also has a resistor 62A, 64A, condenser 63A, time delay network connected to its anode and igniting electrode in a similar fashion as was described for relay TD. Accordingly, the application of the 150 volts operating potential through the closed contact P3 charges condensers 63 and 63A for a time until the voltage on each of these condensers has reached the igniting potential value for the respective switch tubes TD and TD1. Thus these two switch tubes are ignited until 150 volts is removed from their anodes by releasing relay PA. This release occurs when the TD relay is operated, thus removing its ground to the PA relay.

The TD1 switch tube has the TD1 relay shown in Figure 2 connected in series with its cathode via the cable 2. The TD1 relay accordingly is operated to close its contact TD11. This applies ground to the KU or kick-up relay shown in Figure 2, thus causing it to operate. The KU relay serves to kick up the card which is in the slot by causing its solenoid to travel upward against the bottom of the card. The resistor R1 in series with the condenser C1 shown in Figure 2 across contact TD11 is provided for protecting the contact TD11 against arcing. When the TD and TD1 switch tubes are extinguished, the TD and TD1 relays are rendered inoperative accordingly, thus restoring the kick-up relay to its initial condition.

The kick-up relay KU serves to permit the microswitch shown in Figure 2 to open. It will be recalled that the ON relay picked up its ground over contact P1 of the P relay shown in Figure 2. The P relay via cable 1 is connected to contact PA2 of the P1 relay shown in Figure 6. Accordingly, when the PA relay is operated, ground is applied from the PA2 contact via cable 1 to the coil of the P relay. When the P relay operates it removes ground from its P1 contact, thus releasing the ON relay. Contact P2, in closing, applies a circuit to the turnstile control TC to permit it to be operated as long as relay P and PA are operated to open the gate for a given period. This period is determined by the values of the charging condenser and resistor 62 and 63 in Figure 6 since when the TD switch tube is fired relay TD is operated, thus releasing relays PA and P. Relay T in Figure 2 drops out when the On relay is released or otherwise at the end of the time interval determined by the charging time of condenser C, thus releasing the sensing relays.

When the ON relay is restored to its standby condition, the feeler relays, and, in turn, the transfer relays are released. In this manner the entire system is now reset to accept the next card.

Consider the condition when the pass-reject switch 60 is thrown to its reject position. This operates to hold or prevent from passing any of the coded combinations which were hooked up employing the 1–A networks shown in Figure 8. Thus, when the code card E154 is inserted and the proper keys are operated, the DS–X2 chain of relays operates. Ground from the INT1 contact of the INT relay is applied to terminal 65 on the switch and through the switch to operate the reject light to reject relay REJ, thus causing it to operate and lock up over contact REJ1 to ground. Contact REJ2 applies ground to the ON and ONN relays, thus causing the card to be held in the slot. Contact REJ3 actuates buzzer B1 of the alarm circuit, thus informing the guard that a card which it is sought to be picked up is now being retained in the machine. The guard, therefore, must turn off the power to the system in order to release the card.

If a card is inserted for which the 1–A networks are not connected, the INT relay will not be operated and ground is passed through terminal 66 of the pass-reject switch, through a strap to terminal 67, then through the switch to operate the PA relay and the ensuing network as previously described to pass the card holder. Thus, the pass-reject switch 51 may be operated to pass cards coded in accordance with 1–A network connections and reject others, or to reject the cards coded in accordance with 1–A network connections and pass others.

A further feature is provided by this invention. A system is provided whereby the perforations in the cards may be made in accordance with a desired code so that anyone who obtains a number of these cards and puts perforations in them at random still will not be able to pass except on the occurrence of the slightest eventuality. This point may be made more clear by the following:

If we take five elements and label these 0, 1, 2, 4 and 7, we can represent any number from 1–0 by a combination of two of these as shown in the table below.

*Table 1*

| Number | Code Elements Operated | Number | Code Elements Operated |
|---|---|---|---|
| 1 | 0, 1 | 6 | 2, 4 |
| 2 | 0, 2 | 7 | 0, 7 |
| 3 | 1, 2 | 8 | 1, 7 |
| 4 | 0, 4 | 9 | 2, 7 |
| 5 | 1, 4 | 0 | 4, 7 |

It will be seen that the value assigned to any code is the sum of the values assigned to the code elements except for 0, which adds to 11. This type of code is called self checking, as there always must be two, and only two, code elements operated for a valid code since one or three operated are unused. The X2 relays in the DS–X2 relay chain make sure that at least two relays are operated. The circuit shown in Figure 9 assures that not more than three relays are operated in any assigned group of 5.

For the purpose of illustration, let a digit position assignment in accordance with a 2–5 code be made as follows:

*Table 2*

| | Relay and Hole Position | Code Element |
|---|---|---|
| Letter | A, BE | L0. |
| | GL | L1. |
| | DHM | L2. |
| | S | L4. |
| | K | L7. |
| Hundreds | 1, 2, 3 | H0. |
| | 4, 5 | H1. |
| | 6, 7, 8 | H2. |
| | 9 | H4. |
| | 0 | H7. |

| | Relay and Hole Position | Tens Code Element | Units Code Element |
|---|---|---|---|
| Tens and Units | 6, 7, 8 | T0 | U0. |
| | 4, 5 | T1 | U1. |
| | 1, 2, 3 | T2 | U2. |
| | 9 | T4 | U4. |
| | 0 | T7 | U7. |

Figure 9:
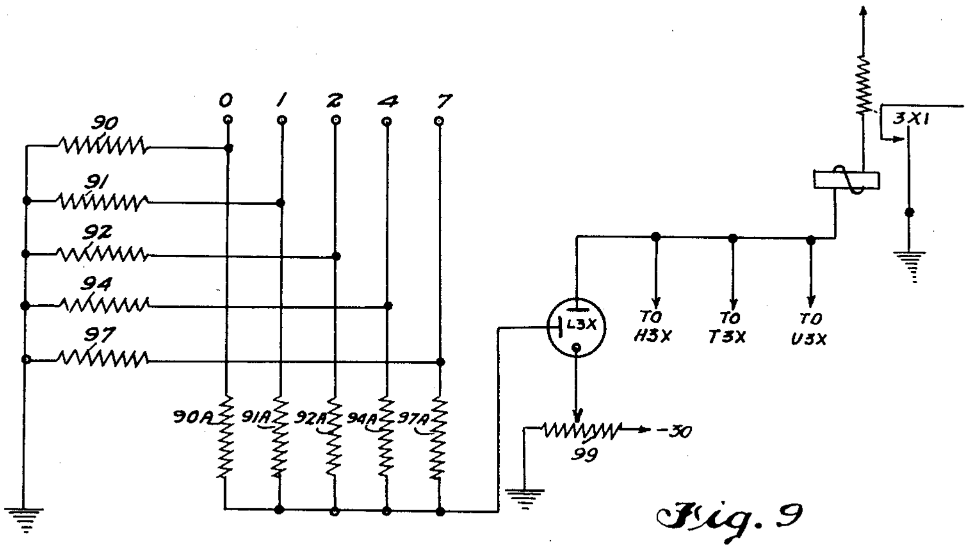
Figure 9 is a diagram of a sensing circuit for determining whether the card being inspected is marked in accordance with the authenticated code.

Referring to Figure 9, terminals designated as 0, 1, 2, 4 and 7 are shown. Each of these have connected thereto two resistors. One of these resistors 90, 91, 92, 94 and 97 is connected to ground. The other of these resistors 90A, 91A, 92A, 94A and 97A is connected to the starter electrode of a switch tube designated as L–3X. These resistors form a summing network. The anode of the switch tube is connected in series with a 3X relay coil. The other end of this relay coil is connected through a limiting resistor to a 150 volt source. This 3X relay is shown in its proper circuit environment in Figure 6. One each of the switch tubes and set of resistors 90—97 and 90A—97A are required for the letters, hundreds, tens and units columns. The switch tubes may be respectively designated as L–3X, H–3X, T–3X and U–3X. All the switch tubes have their anodes connected in parallel as shown in Figure 9 and in turn are connected to the coil of relay 3X.

The function of these resistors is to sum the voltage applied to the terminals 0, 1, 2, 4 and 7. If the sum of the voltages applied exceeds a predetermined amount which is established as representative of that obtained when only two code elements are operating, then this system serves to check whether or not the perforations in the card are within the 2–5 code. The predetermined amount is established by potentiometer 99. If more than two elements are operated, the L–3X or H–3X or TX–3X or U–3X switch tubes may be operated, causing the 3X relay to close to contact 3X1 and thus apply ground to the WN relay and light shown in Figure 6.

Figure 10:
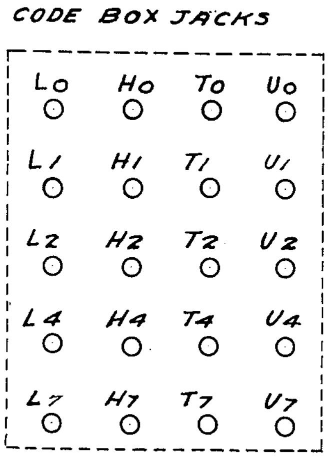
Figure 10 is an arrangement shown to facilitate an explanation of how the terminals of the sensing circuit shown in Figure 9 may be connected to sense whether the markings on a card being inspected fall within an authorized code.

Figure 10 shows a code box arrangement in order to demonstrate how terminals 0, 1, 2, 4 and 7 of Figure 9 may be connected to terminals 0, 1, 2, 4 and 7 of Figure 3 in order to check whether or not the cards are perforated in accordance with the desired code. As previously stated, there are four Figure 3's required; one for hundreds, one for tens, one for units and one for letters. The terminals represented in Figure 10 are the ones to which each of the Figure 3's have their 0, 1, 2, 4, 7 terminals connected. The L designations are for letters, H for hundreds, T for tens and U for units.

Let us, for simplifying the explanation, consider only one Figure 9 network connected to the code box. The terminals would be connected, for example, as follows:

| Figure 9 | Code Box |
|---|---|
| 0 | L2. |
| 1 | H4. |
| 2 | T7. |
| 4 | U1. |
| 7 | H7. |

Any card that has its coding field perforations which excite any three of the jack box terminals will cause the switch tube L–3X to fire, thus activating relay 3X. Looking back at the assignment Table 2, it can be seen how this can be done, namely, what letters or numbers cannot be assigned once the assignments corresponding to any two of the code box jacks connected to the summing network of Figure 9 are used.

Of course there are an extremely limited number of unauthorized cards which can be detected using only one Figure 9, therefore, four Figure 9's are employed altogether. This means that the authorized cards must be marked or perforated to avoid exciting more than two of the terminals in all four of the Figure 9's. This in turn makes the chance of passing unauthorized cards or cards which have been perforated by random chance to an extremely remote one. Furthermore, these code box assignments may be changed very simply and daily if dsired so that the old cards may be used with the new assignments, thus increasing the security afforded by this invention considerably.

Thus, with the 1–A networks, certain card codes can be passed or rejected. With the Figure 9 networks all card codes outside of the approved ones are rejected.

Figure 11:
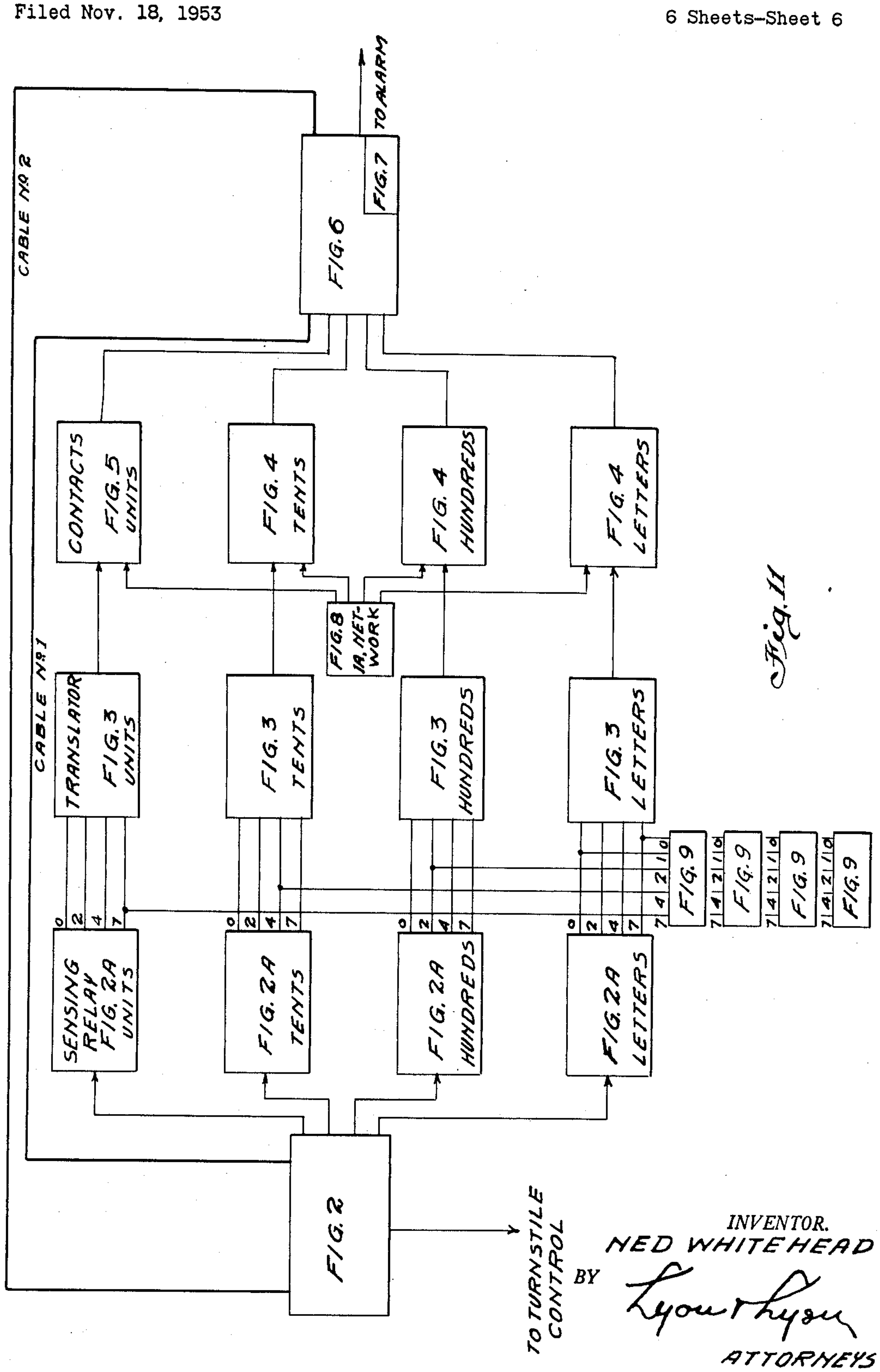
Figure 11 is a block diagram of the embodiment of the invention showing how the circuits shown in Figures 2 through 9 may be fitted together.

In order to sum up what has been previously described, reference is made to Figure 11, which is a block diagram of the embodiment of the invention. Reference thereto shows that the one Figure 2 is required which has the ON or stick relay which holds a card as long as it is operated, as well as the kick-up relay plus the first time delay relay T, and also the feeler relays. These are connected to Figure 2A, of which there are four required, each one including ten sensing relays. One of the ten sensing relays in each one of the four is operated upon the insertion of a card. The sensing relays go via cable 1 to a corresponding transfer circuit. Each of the transfer circuits shown in Figure 3 has the switch tubes and the coils of the associated transferring relays. The interconnection between the sensing relays and the transfer circuit is via four conductors, one of which is labeled 0, the next 2, the next 4 and the next 7. These are brought out to a terminal board shown in Figure 10. Figure 9, of which there are four required, is connected to this terminal board in accordance with the code desired.

To simplify the drawing, the terminal board is omitted and one Figure 9 is shown connected to one of the leads between each of the Figures 2A's and Figure 3's.

The contacts for the transferring relays in each of the Figure 3's are represented in the case of the tens, hundred and letters by Figure 4's, and a block representative of a Figure 4 is shown connected to the respective Figure 3 blocks. The units contacts are represented by Figure 5 and are shown connected to the unit block. By way of example, a single Figure 8, which is the 1–A network, is shown interconnecting one terminal of the units, tens, hundred and letters blocks. As many Figure 8's as there are cards which it is desired to pass or reject may be employed.

Figure 6 contains the DS–X2 relay chain as well as the pass relays and the reject and alarm relays. One Figure 6 is required and Figure 7 is shown in the corner to designate that Figure 7 is merely an exemplification of the apparatus required in Figure 6. The output of Figure 6 goes to an alarm circuit in the case of a reject or a mistake. The output of Figure 6 also goes back to Figure 2 in the case of acceptance to energize the kick-up relay and energize the external turnstile control.

Accordingly, there has been shown and described hereinabove a new and useful system for passing or rejecting, as desired, identification cards which are marked in accordance with a desired code. The cards with which the system has been described are identified as having markings, such as perforations, in their coding field. This is not to be construed as a limitation since it is well within the skill of one versed in the art to alter the feeler relay sensing system to sense cards having magnet areas or other markings in the coding field. Furthermore, other codes than the ones specified herein may be employed.

I claim:

1. A system for authenticating a card having a plurality of columns of digit positions with an identifying mark in each column on a digit position, said system comprising a slot into which said card is inserted, a plurality of mark sensing means, means to retain said card in said slot, means in said slot responsive to the insertion of said card to energize said card retaining means and said mark sensing means to sense the digit positions marked, a plurality of columns of keys identified with the columns of digit positions on said card, a plurality of first switches corresponding to each of the digit positions in each of said columns, means to close one of said first switches in each column upon the actuation of a key in each column corresponding to the digit positions of said marks, an accept switch, means to interconnect different desired ones of said first switches associated with each column with each other to correspond to cards having certain digit positions marked, means responsive to a closure of said interconnected switches to close said accept switch, card ejection means, means responsive to a closure of said accept switch to inactivate said card retaining means and to actuate said card ejection means, alarm means, and means responsive to a closure of other than said interconnected switches to actuate said alarm means.

2. A system for authenticating a card as is recited in claim 1 wherein said means to interconnect different desired ones of said first switches associated with each column comprises a resistor and a number of rectifiers, said number being one less than the number of columns, one electrode of each of said rectifiers being connected to a first switch in a different column, the other end of said rectifiers being connected to one end of said resistor, the other end of said resistor being connected to a first switch in the remaining column.

3. A system for authenticating a card having a plurality of columns of digit positions with a perforation in each column on one of said digit positions, said system comprising a slot into which said card is inserted, a plurality of feeler relays adjacent said slot, a stick relay to retain said card in said slot, a switch responsive to the insertion of said card, to energize said stick relay to hold said card and said feeler relays to sense said perforations, a plurality of switch tubes each having an anode and an igniter electrode, each of said tubes being associated with a different digit position on said card, a plurality of relays each of which is associated with and has its coil in series with a different one of said switch tubes, a source of operating potential for said switch tubes, means to apply said operating potential to certain ones of said switch tubes through their associated relay coils responsive to the perforations sensed in said card by said feeler relays, a plurality of columns of keys identified with the columns of digit positions on said card, each of said keys being associated with a different one of said switch tubes, means to apply igniting potential to the igniting electrodes of said associated switch tubes upon depressing those of said keys corresponding to the digit positions perforated in said card whereby the relays in series with said excited switch tubes are operated, and means responsive to the depression of a key other than one corresponding to the digit positions perforated in said card to indicate an error.

4. A system for inspecting a card having a plurality of columns of digit positions with a perforation in each column on one of said digit positions, said system comprising a slot into which said card is inserted, a plurality of feeler relays adjacent said slot, a stick relay to retain said card in said slot, a pick-up relay to elevate said card in said slot, a switch in said slot responsive to the insertion of said card to energize said stick relay and said feeler relays to sense said perforations, a plurality of sensing relays each of which is associated with a different digit position, means to operate the proper ones of said sensing relays responsive to the perforations sensed by said feeler relays, a plurality of switch tubes each having an anode and an igniter electrode, each of said tubes being associated with a different one of said digit positions, a plurality of transfer relays each of which has its coil in series with a different one of said switch tubes, connections between associated ones of said sensing relays and said switch tubes, means to apply operating potentials from said operated sensing relays through said connections to the ones of said switch tubes associated with the digit positions of the perforations being sense, means coupled to said connections to sense whether proper ones of said switch tubes have said operating potential applied in accordance with a predetermined code for perforating said card digit positions, and means responsive to the sensing of an improperly coded card to provide an alarm.

5. A system for inspecting as recited in claim 4 wherein said means to sense whether proper ones of said switch tubes have said operating potential applied in accordance with a predetermined code comprises at least one summing network connected to desired ones of said connections and relay means connected to said summing network and responsive to a voltage sensed by said summing network in excess of a predetermined value to be actuated thereby.

6. A system for inspecting a card having a plurality of columns of digit positions with a perforation in each column on one of said digit positions, said system comprising a slot into which said card is inserted, a plurality of feeler relays adjacent said slot, a stick relay to retain said card in said slot, a kick-up relay to elevate said card in said slot, a switch in said slot responsive to the insertion of said card to energize said stick relay and said feeler relays to sense said perforations, a plurality of sensing relays each of which is associated with a different digit position, means to operate the proper ones of said sensing relays responsive to the perforations sensed by said feeler relays, a plurality of switch tubes each having an anode and an igniter electrode, each of said tubes being associated with a different one of said digit positions, a plurality of transfer relays each of which has its coil in series with a different one of said switch tubes, connections between associated ones of said sensing relays and said switch tubes, means to apply operating potentials from said operated sensing relays through said connections to the ones of said switch tubes associated with the digit positions of the perforations being sensed, means coupled to said connections to sense whether proper ones of said switch tubes have said operating potential applied in accordance with a predetermined code for perforating said card digit positions, means responsive to the sensing of an improperly coded card to provide an alarm, a plurality of columns of keys, each of said keys corresponding to a digit position on said card, means to apply igniting potential to the igniting electrodes of associated switch tubes upon depressing those of said keys corresponding to the digit positions perforated on said card whereby the transfer relays in series with said excited switch tubes are operated, means responsive to the depression of a key other than one corresponding to the digit positions perforated in said card to indicate an error, means responsive to the operation of desired ones of said transfer relays corresponding to an accepted set of perforations on said card to inactivate said stick relay, said feeler relays, said switch tubes and to activate said pick-up relay, and means responsive to the operation of said transfer relays other than said desired ones corresponding to an unaccepted set of perforations on said card to provide an alarm.

7. A system for inspecting a card having a plurality of columns of digit positions with a perforation in each column on one of said digit positions, said system comprising a slot into which said card is inserted, a plurality of feeler relays adjacent said slot, a kick-up relay to elevate said card in said slot, a stick relay to retain said card in said slot, a switch in said slot responsive to insertion of said card to energize said stick relay and said feeler relays to sense said perforations, a plurality of feeler relays each of which is associated with a different digit position, means responsive to said feeler relays to operate the proper ones of said sensing relays associated with the perforations sensed by said feeler relays, a plurality of transfer relays each of which corresponds to a different one of said digit positions, connecting means interconnecting groups of said sensing relays and with groups of said transfer relays associated with the same digit positions, means to apply a potential through said connecting means to prime for operation groups of said transfer relays responsive to the operated ones of said sensing relays, means coupled to said connecting means to sense whether proper groups of said transfer relays are operated in accordance with a predetermined code for perforating said card digit positions, means responsive to the sensing of an improperly coded card to provide an alarm, a plurality of columns of keys, each of said keys corresponding to a digit position on said card, means responsive to the depression of keys corresponding to the digit positions perforated on said card to operate those of said transfer relays likewise associated with said digit positions which have been primed by said sensing relays, means responsive to the depression of a key other than one corresponding to the digit positions perforated in said card to indicate an error, means responsive to the operation of desired ones of said transfer relays corresponding to an accepted set of perforations on said card to inactivate said stick relay, said feeler relays and said transfer relays and to activate said kick-up relay, and means responsive to the operation of said transfer relays other than said desired ones corresponding to an unaccepted set of perforations on said card to provide an alarm.

8. A system for inspecting a card having several columns of digit positions, said card having at least one perforation in said card at a digit position in each column, said system comprising a slot into which said card is inserted, a plurality of feeler relays adjacent said slot, a stick relay to retain said card in said slot, a kick-up relay to elevate said card in said slot, a switch in said slot responsive to the insertion of said card to energize said stick relay and said feeler relay to sense said perforations, a plurality of sensing relays each of which is associated with a different digit position, means to operate the proper ones of said sensing relays responsive to the perforations sensed by said feeler relays, a plurality of switch tubes each associated with a different digit position, each tube having an anode and an igniter electrode, a plurality of transfer relays each of which has its coil in series with a different one of said switch tubes and being likewise associated with a different digit position, means coupling groups of said sensing relays with groups of said switch tubes associated with the same digit positions, means to apply operating potentials from said operated sensing relays through said coupling means to the corresponding ones of said switch tubes, a plurality of keys, each of which is associated with a different one of said digit positions, a key relay for each group of keys corresponding to one of said columns, means responsive to the operation of the keys corresponding to the perforated digit positions to operate said key relays and to apply igniting potentials to the igniting electrodes of said switching tubes associated with said digit positions, a column relay for each group of transfer relays corresponding to one of said columns, a last one of said columns having in addition a selection relay, means to operate said column relays responsive to the operation of a transfer relay in each column, means to interconnect a transfer relay from each column with a transfer relay in said last one of said columns, means responsive to operation of the interconnected transfer relays to operate said selection relay, means responsive to a failure of operation of any one of said column relays and key relays to indicate a rejection of said card, means responsive to an operation of any one of said column relays, said key relays and a failure in operation of said selection relay to indicate a rejection of said card, and means responsive to operation of all said column relays, all said key relays and said selection relay to inactivate said stick relay and said selecting relays and to activate said kick-up relay.

References Cited in the file of this patent

UNITED STATES PATENTS

| | | |
|---|---|---|
| 1,497,893 | Daubmeyer | June 17, 1924 |
| 1,853,215 | Lorant | Apr. 12, 1932 |
| 2,122,206 | Keefe | June 28, 1938 |
| 2,315,741 | Shafer | Apr. 6, 1943 |
| 2,345,858 | Nevin | Apr. 4, 1944 |